United States Patent

[11] 3,624,217

[72] Inventor Richard C. Koch
Niantic, Conn.
[21] Appl. No. 41,532
[22] Filed May 28, 1970
[45] Patented Nov. 30, 1971
[73] Assignee Pfizer Inc.
New York, N.Y.
Continuation-in-part of application Ser. No. 788,642, Jan. 2, 1969, now abandoned. This application May 28, 1970, Ser. No. 41,532

[54] 2-(SUBSTITUTED)-5,6-DIHYDRO-4H-1,3-THIAZINES FOR THE CONTROL OF RICE BLAST
10 Claims, No Drawings

[52] U.S. Cl. .......... 424/246
[51] Int. Cl. .......... A61k 27/00
[50] Field of Search .......... 424/246; 260/999

[56] References Cited

FOREIGN PATENTS 1,102,466 2/1968 Great Britain ................

*Primary Examiner*—Jerome D. Goldberg
*Attorney*—Connolly and Hutz

ABSTRACT: The control of rice blast disease on rice plants by contacting the plants with a fungicidally effective amount of a composition comprising, as active ingredient, a compound having the formula and the nonphytotoxic acid addition salts thereof, and a carrier therefor, wherein R is 2-thienyl, 1-naphthyl, 2-naphthyl, 3,4-methylenedioxyphenyl or wherein X is hydrogen, chloro, bromo, fluoro, nitro, methyl, or ethyl, with the proviso that when Y is $—(CH_2)_n—$, X is other than hydrogen;
Y is —CH═CH—, $—C(CH_3)═CH—$, $—CH═C(CH_3)—$, —C(OH)═CH—, or $—(CH_2)_n—$
wherein *n* is an integer of from 2 to 4; and
Z is ethylene or trimethylene.

2-(SUBSTITUTED)-5,6-DIHYDRO-4H-1,3-THIAZINES FOR THE CONTROL OF RICE BLAST

CROSS-REFERENCE TO RELATED APPLICATION

This application is a continuation-in-part of my copending application, Ser. No. 788,642, filed Jan. 2, 1969 and now abandoned.

BACKGROUND OF THE INVENTION

This invention relates to the use of certain 2-(substituted)-5,6-dihydro-4H-1,3-thiazines and 2-(substituted)-2-thiazolines as agents for the control of rice blast disease on rice plants. More particularly, it relates to the use of 2-[ω-(substituted)alkyl]- and [2-(2-substituted)vinyl]-5,6-dihydro-4H-1,3-thiazines and thiazolines for the prevention of rice blast disease on rice plants.

Rice, one of the most important cereal grains, is grown in coastal plains, tidal deltas, and river basins in temperate, tropical and tropical regions. It is the staple food of a large segment of the world's population, the major part of which depends almost entirely upon rice and lives in the poorer and more thickly populated areas of the rice-growing regions.

Rice, or more correctly, the rice plant, like all field crops, is subject to a variety of diseases, the most serious of which is rice blast, a fungal disease caused by *Piricularia oryzae*. The disease is prevalent in most of the humid rice-producing regions of the world. The whole aerial part of the plant is attacked. The most conspicuous symptom is neck rot which is characterized by the necks breaking over. Other symptoms are the blighting or blasting of the heads, spots on the leaves, leaf sheaths, and stems. The overall result of the disease is a decrease in yield and quality of the rice.

Control measures appear to have developed along two principal lines, cultural and chemical. The various cultural control measures developed include production of resistant varieties of rice, timing of transplanting, clean cultivation, seed selection, and controlled irrigation.

Chemical measures of control such as the use of fungicidal seed dressings and foliage fungicides are prophylactic in nature and have little if any therapeutic value. The agents most commonly used for such treatments are organic mercurials, copper sulfate, benzoquinones, naphthoquinones, thiuram disulfate, dithiocarbamates, pentachlorobenzyl alcohol and 0,0-diethyl-S-benzylthiophosphate. More recently, therapeutic measures of control using antibiotics such as blasticidin, Kasugamycin and blasticidin-S-benzlaminobenzene sulfonate have come into use.

Such chemical methods of control, however, are not satisfactory for one or more reasons such as a low level of effectiveness, inhibition of seed germination, tendency toward phytotoxic effects, high material costs, and in the case of mercury compounds, the presence of toxic residue on the treated crop. Additionally, the use of blasticidin requires extreme care in its use because of its toxicity.

SUMMARY OF THE INVENTION

It has been found that certain 2-(substituted)-2-thiazolines and 2-(substituted)-5,6-dihydro-4H-1,3-thiazines are effective agents for the prevention of rice blast on rice plants. The present invention comprises a process for the prevention of rice blast disease on rice plants which comprises contacting the plants with a fungicidally effective amount, in admixture with a carrier, of a compound having the formula

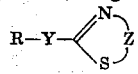

and the nonphytotoxic acid addition salts thereof wherein R is selected from the group consisting of 2-thienyl, 1-naphthyl, 2-naphthyl, 3,4-methylenedioxyphenyl and

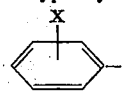

wherein

X is selected from the group consisting of hydrogen, chloro, bromo, fluoro, nitro, methyl and ethyl, with the proviso that when Y is —(CH₂)ₙ—X is other than hydrogen; and Z is selected from the group consisting of ethylene and trimethylene; and Y is selected from the group consisting of —CH=CH—, —CH=C(CH₃)—, —C(CH₃)=CH—, —C(OH)=CH—, and —(CH₂)ₙ—wherein n is an integer of from 2 to 4.

Also included within this invention are the nonphytotoxic acid addition salts of the above-named compounds. By "nonphytotoxic" acid addition salts is meant those salts which are not toxic to the rice plants or seeds at the level used to achieve antifungal action.

The nonphytotoxic acid addition salts of the above-mentioned bases which may be employed are the water-soluble and water-insoluble salts such as the hydrochloride, hydrobromide, phosphate, nitrate, sulfate, acetate, ββ-dimethylbutyrate citrate, gluconate, benzoate, propionate, butyrate, sulfosalicylate, maleate, laurate, malate, fumarate, succinate, oxalate, tartrate, amsonate (4,4'-diaminostilbene-2,2'disulfate), pamoate (1,1'-methylene-bis-2-hydroxy-3naphthoate), stearate, 2-hydroxy-3-naphthoate, p-toluenesulfonate and suramin salt.

The compounds described herein are preferably used in the form of their free bases since they are not water soluble and thus are not washed off the plants. Additionally, the free base forms are absorbed to a greater extent by the plants than are the salt forms. The water-soluble salts of these compounds are favored over the water-soluble salts precisely because of their insolubility which results in relatively longer retention on the plant compared to that of the water soluble salts.

The compounds described herein are applied with a diluent or carrier, liquid or solid, in the form of sprays, including emulsions, slurries, and solutions, and as dusts. When applied to rice plants these compounds are preferably applied as sprays of solutions, slurries, or emulsions containing the desired agent at a total volume of spray of from about 100 liters to about 400 liters per acre. The concentration of active ingredient in the spray can range from about liters 10 to about 500 parts per million p.p.m.

In general, the volume of spray per acre is desirably in the range of from about 150 to about 175 liters per acre, 160 liters per acre being the preferred volume. Application at these levels is sufficient to achieve runoff and achieves substantially complete contact of the surface of the rice plant with the active ingredient. The use of water-soluble forms of these agents is preferred for foliar sprays over that of the water soluble forms to avoid their removal from the plants by rain or flooding.

For convenience and economy of application, the active ingredients are formulated into dusts, wettable powders or emulsifiable concentrates. The dusts are made by mixing the proper amount of active ingredient with a diluent or carrier such as talc, clay, calcite, pyrophyllite, diatomaceous earth, walnut shell flour, silica gel, hydrated alumina or calcium silicate to afford a concentration of active ingredient of from about 2 percent to about 4 percent by weight. The dusts can also be prepared by mixing the desired dust diluent or carrier with a solution of the active ingredient of choice in a volatile organic solvent such as benzene or acetone. The solvent is then removed by evaporation and the mixture ground.

Wettable powders, of special value for spray applications, are made by adding suitable wetting agents and conditioning agents to the dusts.

Emulsifiable concentrates are made by dissolving the active ingredient and an emulsifying agent in a substantially water-immiscible organic solvent. Suitable solvents are toluene, xylene and petroleum oil or an alkylated naphthalene. The volatile solvents, e.g., toluene, xylene, evaporate after spraying to leave a deposit of the active agent upon the plant. The nonvolatile solvents leave an oily solution of the active ingredient upon the plant. The emulsifying agent can be cationic, anionic, or nonionic as is well known to those skilled in the art. As suitable emulsifiers there may be mentioned soap (anionic), lauryl pyridinium chloride (cationic) and the nonionic polyoxyethylene lauryl ether (reaction product of ethylene oxide, 10 moles, with dodecylalcohol, 1 mole). Such concentrates contain, in general, from 2 to 50 percent of the active ingredient. They are mixed with a sufficient volume of water to provide a concentration of active ingredient of from 10 to 500 p.p.m. For the present purpose, the resulting emulsion is applied at a rate of from about 100 to 400 liters per acre and usually at 150 to 175 liters per acre.

Of course, if a water soluble salt of the chosen active ingredient is used, it is most conveniently applied in the form of an aqueous spray. Here also, the rate of application is desirably from about 150 to 175 liters per acre of a solution containing 10 to 500 p.p.m. of active ingredient.

The agents described herein can also be used as fungicidal seed dressings. When used for the treatment of seeds the favored forms of these fungicides are as dusts, solutions, slurries, or emulsions which are applied directly to the seed by appropriate means as by tumbling with the dust or mixing in the solution. For seed protection the levels of antifungal agent mentioned above are used, e.g., 10 to 500 p.p.m. of active ingredient in solutions, emulsions sprays and 2 percent to 4 percent in dusts.

In the formulations mentioned above, as those skilled in the art will appreciate, a wide choice of diluents, emulsifiers, wetting agents or solvents, is available. The particular diluent, emulsifier, solvent or wetting agent best suited for a given formulation is readily determined by simple experiment.

Despite the fact that some of the compounds described herein exhibit phytotoxic effects to a greater or lesser degree at the higher levels of application illustrated in no way affects their usefulness for the purpose of this invention. Lower rates of application can be used with significant control of rice blast disease.

The novel compounds of this invention wherein Y is —C(OH)=CH— are prepared by reaction of the appropriate β-oxo-2-(R-substituted)propionitrile with an ω-mercaptoalkylamine hydrochloride; e.g., 3-amino-1-propanethiol hydrochloride and 2-amino-1-ethanethiol hydrochloride (cysteamine hydrochloride), in a suitable solvent such as a lower alkanol (e.g., ethanol). The reaction is conducted at a temperature of from about 50° C. to the reflux temperature of the solvent in the presence of an acid acceptor such as triethylamine or other tertiary amine for a period of from about 2 to about 20 hours. The product is recovered by making the reaction mixture basic with aqueous alkali and extracting the product therefrom with chloroform or other water-immiscible solvent. Removal of the solvent affords the crude product which is purified by recrystallization from a suitable solvent.

Those compounds wherein Y is $(CH_2)_n$—, many of which are known, are prepared by methods described in the literature (J. Med. Chem. 13, 113–119, 1970); namely, (1) reaction of a nitrile R—$(CH_2)_n$—CN with cysteamine or 3-amino-1-propanethiol in a suitable solvent (e.g., ethanol) at an elevated temperature; (2) condensation of a thioamide R—$(CH_2)_n$—CSNH$_2$ with 3-bromo-1-propylamine or 2-bromoethylamine; (3) condensation of carboxylic acids R—$(CH_2)_n$—COOH, or lower alkyl esters thereof, with 3-amino-1-propanol or ethanolamine to give N-(3-hydroxypropyl) or N-(2-hydroxyethyl)carboxamides which are then heated with phosphorous pentasulfide.

The herein described products wherein Y is —CH═CH— are conveniently prepared by the direct condensation of an aldehyde R—CHO with 2-methyl-2-imidazoline or 5,6-dihydro-2-methyl-4H-1,3-thiazine at a temperature of from about 50° C. to about 150° C. In the presence or absence of a solvent which forms an azeotrope with the by-product water. Alternatively, the byproduct water is removed through the sue of a molecular sieve.

Similarly, those compounds wherein Y is —CH═C(CH$_3$)— are prepared by condensation of 2-ethyl-5,6-dihydro-4H-1,3-thiazine or 2-ethyl-2-thiazoline with the appropriate aldehyde R—CHO under conditions which result in the elimination of byproduct water.

Those compounds in which Y is —C(CH$_3$)═Ch— are prepared by the process described in British Specification 1,191,372 which comprises conversion of (a) an appropriate ketone of formula R—CO—CH$_3$ to the corresponding β-methyl acrylic acid ester by reaction with the carbanion of a tri(lower alkly)phosphonoacetate; (b) transformation of the β-methylacrylic acid ester to the corresponding β-methylacrylic acid; (c) followed by reaction of the acid with dimethylformamide and a di(lower alkyl)phosphoryl chloride and treatment of the resulting product with ammonia to produce a β-methyl acrylamide, (d) conversion of the amide to the corresponding lower alkly β-methylacrylimidate fluoborate by reaction with a tri(lower alkyl)oxonium fluoborate; and (e) condensation of the lower alkyl β-methylacrylimidate fluoborate with an ω-mercapto alkylamine to produce the corresponding cyclic thioimidate.

Compounds of the above formula wherein the thiazoline and dihydrothiazine moieties are substituted with a methyl group, i.e., those wherein Z is a monomethyl-substituted ethylene or a monomethyl-substituted trimethylene group, are also valuable agents for the prevention of rice blast disease on rice plants, and are used in the same manner as are the remaining compounds described herein.

The following examples are provided by way of illustration.

EXAMPLE I

The protectant value of the herein described compounds against blast caused by *Piricularia oryzae* is determined by subjecting rice plants in the fully developed second-leaf growth stage to a spray of the test compound until runoff. The test compound is dissolved in a suitable solvent, e.g., water, acetone, methanol, ethanol, and diluted to the desired concentration level with deionized water containing wetting and dispersing agents, e.g., nonionic surface active agents such as partial esters of fatty acids and hexitol anhydrides derived from sorbitol (Span 85, sorbitan trioleate), and polyoxyethylene ethers of such partial esters Tween80), both of which are available from Atlas Chemical Industries, Inc. These materials are used at levels of 200 p.p.m. and 50 p.p.m. in the final spray.

The treated plants are allowed to dry, then spray-inoculated with an aqueous spore suspension of *Piricularia oryzae* (200 spores/microscopic field at 100X) to runoff, then are placed in an incubation chamber at 70° F. and 95 percent relative humidity. After about 30 hours incubation, the plants are removed to the greenhouse for disease development. Untreated inoculated controls are run at the same time. Within 5 days infection lesions are sufficiently developed to permit assessment of control.

The severity of the infection is determined by actual count of the number of infection lesions appearing on the treated plants compared to the lesions appearing on the control plants. Phenyl mercury acetate (PMAS, available from W. A. Cleary Corps., New Brunswick, N.J., an emulsifiable concentrate containing 10 percent phenyl mercury acetate) is used as a reference standard. Rice plants are treated with an aqueous spray of this standard material as described above at a concentration of 200 p.p.m. Three replicates of each test are run.

In this manner, the effectiveness of the following compounds against rice blast disease is demonstrated at various levels:

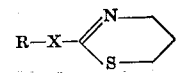

| R | X | P.p.m. | Percent control | Relative phytotoxicity [1] |
|---|---|---|---|---|
| 1-naphthyl | —CH=CH— | 500 | 90 | Moderate. |
| Do | —CH=CH— | 200 | 66 | None. |
| Do | —CH=CH— | 1,000 | 63 | Slight. |
| 2-naphthyl | —CH=CH— | 1,000 | 93 | Do. |
| Phenyl | —CH=CH— | 500 | 81 | Toxic. |
| Do | —CH=CH— | 500 | 100 | Moderate. |
| o-Tolyl | —CH=CH— | 500 | 93 | Slight. |
| m-Tolyl | —CH=CH— | 500 | 88 | Do. |
| Do | —CH=CH— | 500 | 95 | Do. |
| p-Tolyl | —CH=CH— | 500 | 62 | Do. |
| Do | —CH=CH— | 250 | 43 | None. |
| Do | —CH=CH— | 500 | 97 | Do. |
| 2-chlorophenyl | —CH=CH— | 500 | 69 | Do. |
| Do | —CH=CH— | 500 | 40 | Do. |
| Do | —CH=CH— | 500 | 65 | Do. |
| Do | —CH=CH— | 250 | 29 | Do. |
| Do | —CH=CH— | 250 | 89 | Do. |
| Do | —CH=CH— | 200 | 100 | Slight. |
| 2-bromophenyl | —CH=CH— | 500 | 74 | None. |
| 4-bromophenyl | —CH=CH— | 500 | 100 | Toxic. |
| Do | —CH=CH— | 250 | 94 | None. |
| Do | —CH=CH— | 100 | 63 | Do. |
| Do | —CH=CH— | 500 | 85 | Slight. |
| 3-fluorophenyl | —CH=CH— | 250 | 73 | None. |
| Do | —CH=CH— | 500 | 91 | Slight. |
| 4-fluorophenyl | —CH=CH— | 500 | 63 | Do. |
| Do | —CH=CH— | 250 | 51 | Do. |
| Do | —CH=CH= | 1,000 | 81 | Do. |
| 4-nitrophenyl | —CH=CH= | 500 | 96 | None. |
| Do | —CH=CH= | 250 | 89 | Do. |
| Do | —CH=CH= | 500 | 84 | Slight. |
| 3,4-methylenedioxyphenyl | —CH=CH= | 250 | 47 | None. |
| Do | —CH=CH= | 1,000 | 91 | Slight. |
| 2-thienyl | —CH=CH= | 500 | 85 | None. |
| Do | —CH=CH= | 1,000 | 91 | Slight. |
| o-Tolyl | —CH₂CH₂— | 1,000 | 90 | None. |
| 2-chlorophenyl | —CH₂CH₂— | 500 | 99 | Do. |
| Do | —CH₂CH₂— | 250 | 100 | Do. |
| Do | —CH₂CH₂— | 100 | 85 | Do. |
| Do | —CH₂CH₂— | 500 | 83 | Do. |
| 4-bromophenyl | —CH₂CH₂— | 250 | 80 | Do. |
| Do | —CH₂CH₂— | 100 | 42 | Do. |
| Do | —CH₂CH₂— | 1,000 | 90 | Do. |
| 4-nitrophenyl | —CH₂CH₂— | 500 | 49 | Do. |

[1] Slight-mild chlorosis; moderate-leaf burn; toxic-phytotoxic.

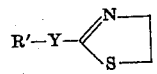

| R' | X | P.p.m. | Percent control | Relative phytotoxicity [1] |
|---|---|---|---|---|
| Phenyl | —(CH₂)₂— | 1,000 | 79 | None. |
| 2-thienyl | —(CH₂)₂— | 1,000 | 90 | Do. |
| Do | —CH=CH— | 1,000 | 89 | Slight. |
| Phenyl mercuric acetate | | 20 | 100 | None. |

EXAMPLE II

Following the procedure of example I, the effectiveness of the compounds tabulated below against rice blast disease can be demonstrated at levels of 1,000 500 and 250 p.p.m.

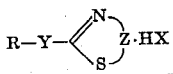

| R | Y | Z | Salt (HA) |
|---|---|---|---|
| 2-chlorophenyl | —(CH₂)₂— | Tri | Hydrochloride. |
| Do | —(CH₂)₂— | Tri | p-Toluenesulfonate. |
| Do | —(CH₂)₂— | Tri | Sulfate. |
| 3-chlorophenyl | —(CH₂)₂— | Tri | Citrate. |
| 4-chlorophenyl | —(CH₂)₂— | Tri | Hydrochloride. |
| 2-bromophenyl | —(CH₂)₂— | Tri | Stearate. |
| 4-fluorophenyl | —(CH₂)₂— | Tri | Phosphate. |
| 2-chlorophenyl | —(CH₂)₃— | Tri | |
| 3-fluorophenyl | —(CH₂)₃— | Tri | |
| 4-chlorophenyl | —(CH₂)₃— | Tri | |
| 2-chlorophenyl | —(CH₂)₄— | Tri | |
| 2-bromophenyl | —(CH₂)₄— | Tri | |
| 2-nitrophenyl | —(CH₂)₄— | Tri | Hydrochloride. |
| 3-nitrophenyl | —(CH₂)₄— | Tri | Amsonate. |
| 2-nitrophenyl | —(CH₂)₃— | Tri | |
| Do | —(CH₂)₃— | Tri | Gluconate. |
| 4-chlorophenyl | —(CH₂)₄— | Tri | Laurate. |
| Do | —(CH₂)₃— | Tri | Do. |
| 4-bromophenyl | —(CH₂)₃— | Tri | 2-hydroxy-3-naphthoate. |
| 1-napthyl | —(CH₂)₂— | Tri | p-Toluenesulfonate. |
| Do | —(CH₂)₃— | Tri | |
| Do | —(CH₂)₄— | Tri | 2-hydroxy-3-naphthoate. |
| 2-naphthyl | —(CH₂)₂— | Tri | Hydrochloride. |
| Do | —(CH₂)₃— | Tri | Do. |
| 2-methylphenyl | —(CH₂)₂— | Tri | Lactate. |
| 3-methylphenyl | —(CH₂)₂— | Tri | Citrate. |
| 4-methylphenyl | —(CH₂)₂— | Tri | |
| 2-ethylphenyl | —(CH₂)₂— | Tri | Laurate. |
| 3-ethylphenyl | —(CH₂)₂— | Tri | Sulfate. |
| 4-ethylphenyl | —(CH₂)₂— | Tri | |
| 2-methylphenyl | —(CH₂)₃— | Tri | |
| 4-methylphenyl | —(CH₂)₃— | Tri | |

EXAMPLE III

A rice paddy having plants in the fully developed second-leaf growth stage is dusted with a composition comprising 4 percent by weight of 2-[2-chlorophenyl)ethyl]-5,6-dihydro-4 H-1,3-thiazine benzoate as the active ingredient and 96 percent by weight of diatomaceous earth as diluent at the rate of 4 kg. dust per acre.

| R | Y | Z | Salt (HA) |
|---|---|---|---|
| 3-methylphenyl | —(CH₂)₄— | Tri | |
| 4-ethylphenyl | —(CH₂)₃— | Tri | Propionate. |
| Do | —(CH₂)₄— | Tri | Nitrate. |
| 2-chlorophenyl | —(CH₂)₂— | Tri | Pamoate. |
| Do | —CH=CH— | Tri | Benzoate. |
| Do | —CH=CH— | Tri | Hydrochloride. |
| 3-chlorophenyl | —CH=CH— | Tri | Gluconate. |
| 4-chlorophenyl | —CH=CH— | Tri | Laurate. |
| 2-bromophenyl | —CH=CH— | Tri | Hydrobromide. |
| 4-bromophenyl | —CH=CH— | Tri | Acetate. |
| 2-chlorophenyl | —CH=CH— | Tri | Do. |
| 2-fluorophenyl | —CH=CH— | Tri | Hydrochloride. |
| 4-fluorophenyl | —CH=CH— | Tri | Do. |
| 4-nitrophenyl | —CH=CH— | Tri | Stearate. |
| 2-nitrophenyl | —CH=CH— | Tri | |
| 2-methylphenyl | —CH=CH— | Tri | Benzoate. |
| 3-methylphenyl | —CH=CH— | Tri | Butyrate. |
| 4-methylphenyl | —CH=CH— | Tri | Hydrochloride. |
| 2-ethylphenyl | —CH=CH— | Tri | Malate. |
| 4-ethylphenyl | —CH=CH— | Tri | |
| 4-methylphenyl | —CH=CH— | Tri | p-Toluenesulfonate. |
| 3,4-methylenedioxyphenyl | —(CH₂)₂— | Tri | Sulfate. |
| Do | —(CH₂)₄— | Tri | |
| 2-chlorophenyl | —(CH₂)₂— | Eth | |
| 3-chlorophenyl | —(CH₂)₂— | Eth | Hydrochloride. |
| 4-chlorophenyl | —(CH₂)₂— | Eth | |
| 2-bromophenyl | —(CH₂)₂— | Eth | Hydrobromide. |
| 4-bromophenyl | —(CH₂)₂— | Eth | Citrate. |
| 2-fluorophenyl | —(CH₂)₂— | Eth | Sulfate. |
| 3-fluorophenyl | —(CH₂)₂— | Eth | Stearate. |
| 2-nitrophenyl | —(CH₂)₂— | Eth | |
| 4-nitrophenyl | —(CH₂)₂— | Eth | |
| 2-methylphenyl | —(CH₂)₂— | Eth | p-Toluenesulfonate. |
| 4-methylphenyl | —(CH₂)₂— | Eth | Nitrate. |
| 3-ethylphenyl | —(CH₂)₂— | Eth | |
| 1-naphthyl | —(CH₂)₂— | Eth | Amsonate. |
| 2-naphthyl | —(CH₂)₂— | Eth | Gluconate. |
| 2-chlorophenyl | —(CH₂)₃— | Eth | Malate. |
| 4-chlorophenyl | —(CH₂)₃— | Eth | 2-hydroxy-3-naphthoate. |
| 2-bromophenyl | —(CH₂)₃— | Eth | |
| 4-nitrophenyl | —(CH₂)₃— | Eth | Sulfosalicylate. |
| 1-naphthyl | —(CH₂)₃— | Eth | |
| 4-fluorophenyl | —(CH₂)₃— | Eth | Sulfate. |
| 2-methylphenyl | —(CH₂)₃— | Eth | |
| 3-methylphenyl | —(CH₂)₃— | Eth | |
| 4-ethylphenyl | —(CH₂)₃— | Eth | |
| 2-chlorophenyl | —(CH₂)₄— | Eth | |
| 3-chlorophenyl | —(CH₂)₄— | Eth | Benzoate. |
| 4-bromophenyl | —(CH₂)₄— | Eth | |
| 2-fluorophenyl | —(CH₂)₄— | Eth | |
| 3-nitrophenyl | —(CH₂)₄— | Eth | Hydrochloride. |
| 4-nitrophenyl | —(CH₂)₄— | Eth | Oxalate. |
| 2-methylphenyl | —(CH₂)₄— | Eth | Benzoate. |
| 4-methylphenyl | —(CH₂)₄— | Eth | Fumarate. |
| 3-ethylphenyl | —(CH₂)₄— | Eth | Succinate. |
| 2-naphthyl | —(CH₂)₄— | Eth | Citrate. |
| 2-chlorophenyl | —CH=CH— | Eth | |
| 3-chlorophenyl | —CH=CH— | Eth | Sulfate. |
| 4-bromophenyl | —CH=CH— | Eth | Benzoate. |
| 4-fluorophenyl | —CH=CH— | Eth | p-Toluenesulfonate. |
| 2-nitrophenyl | —CH=CH— | Eth | Stearate. |
| 2-methylphenyl | —CH=CH— | Eth | Do. |
| 4-methylphenyl | —CH=CH— | Eth | Laurate. |
| 2-ethylphenyl | —CH=CH— | Eth | Hydrochloride. |
| 1-naphthyl | —CH=CH— | Eth | Do. |
| 2-naphthyl | —CH=CH— | Eth | Phosphate. |
| 3,4-methylenedioxyphenyl | —CH=CH— | Eth | |
| Do | —(CH₂)₂— | Eth | Sulfate. |
| Do | —(CH₂)₄— | Eth | |
| 2-thienyl | —(CH₂)₂— | Eth | Sulfate. |
| Do | —(CH₂)₃— | Eth | Hydrochloride. |
| Do | —(CH₂)₄— | Tri | p-Toluenesulfonate. |
| Do | —(CH₂)₂— | Tri | Stearate. |
| Do | —(CH₂)₃— | Tri | |
| Do | —(CH₂)₄— | Tri | |
| 1-naphthyl | —CH=C(CH₃)— | Tri | |
| 2-naphthyl | —CH=C(CH₃)— | Tri | Hydrochloride. |
| 2-thienyl | —CH=C(CH₃)— | Tri | Tartrate. |
| 2-phenyl | —CH=C(CH₃)— | Tri | Hydrochloride. |
| 2-chlorophenyl | —CH=C(CH₃)— | Tri | |
| 3-chlorophenyl | —CH=C(CH₃)— | Tri | Hydrobromide. |
| 2-bromophenyl | —CH=C(CH₃)— | Tri | Sulfosalicylate. |
| 4-bromophenyl | —CH=C(CH₃)— | Tri | Maleate. |
| 3-fluorophenyl | —CH=C(CH₃)— | Tri | Hydrochloride. |
| 2-nitrophenyl | —CH=C(CH₃)— | Tri | Fumarate. |
| 3-nitrophenyl | —CH=C(CH₃)— | Tri | Benzoate. |
| 2-methylphenyl | —CH=C(CH₃)— | Tri | p-Toluenesulfonate. |
| 4-methylphenyl | —CH=C(CH₃)— | Tri | |
| 3-ethylphenyl | —CH=C(CH₃)— | Tri | |
| 3,4-methylenedioxyphenyl | —CH=C(CH₃)— | Tri | Hydrochloride. |
| 1-naphthyl | —C(CH₃)=CH— | Tri | Do. |
| 2-thienyl | —C(CH₃)=CH— | Tri | Citrate. |
| 2-phenyl | —C(CH₃)=CH— | Tri | Sulfate. |
| 2-chlorophenyl | —C(CH₃)=CH— | Tri | |
| 4-chlorophenyl | —C(CH₃)=CH— | Tri | Laurate. |
| 4-bromophenyl | —C(CH₃)=CH— | Tri | Stearate. |
| 2-fluorophenyl | —C(CH₃)=CH— | Tri | |
| 2-methylphenyl | —C(CH₃)=CH— | Tri | 2-hydroxy-3-naphthoate. |
| 3-methylphenyl | —C(CH₃)=CH— | Tri | Succinate. |
| 4-ethylphenyl | —C(CH₃)=CH— | Tri | |
| 2-nitrophenyl | —C(CH₃)=CH— | Tri | Hydrochloride. |
| 3,4-methylenedioxyphenyl | —C(CH₃)=CH— | Tri | Do. |
| 1-naphthyl | —C(OH)=CH— | Tri | |
| 2-naphthyl | —C(OH)=CH— | Tri | |
| 2-thienyl | —C(OH)=CH— | Tri | Benzoate. |
| Phenyl | —C(OH)=CH— | Tri | Stearate. |
| 2-chlorophenyl | —C(OH)=CH— | Tri | Laurate. |
| 4-bromophenyl | —C(OH)=CH— | Tri | Sulfate. |
| 3-fluorophenyl | —C(OH)=CH— | Tri | Hydrochloride. |
| 4-nitrophenyl | —C(OH)=CH— | Tri | |

| R | Y | Z | Salt (HA) |
| --- | --- | --- | --- |
| 2-methylphenyl | —C(OH)=CH— | Tri | Fumarate. |
| 4-ethylphenyl | —C(OH)=CH— | Tri | Tartrate. |
| 3,4-methylenedioxyphenyl | —C(OH)=CH— | Tri | |
| 1-naphthyl | —C(OH)=CH— | Eth | Hydrochloride. |
| 2-thienyl | —C(OH)=CH— | Eth | Acetate. |
| Phenyl | —C(OH)=CH— | Eth | Butyrate. |
| 2-chlorophenyl | —C(OH)=CH— | Eth | Oxalate. |
| 3-chlorophenyl | —C(OH)=CH— | Eth | |
| 2-bromophenyl | —C(OH)=CH— | Eth | |
| 4-fluorophenyl | —C(OH)=CH— | Eth | |
| 2-nitrophenyl | —C(ON)=CH— | Eth | Phosphate. |
| 2-methylphenyl | —C(OH)=CH— | Eth | Oxalate. |
| 4-ethylphenyl | —C(OH)=CH— | Eth | Propionate. |
| 3,4-methylenedioxyphenyl | —C(OH)=CH— | Eth | Hydrochloride. |
| 2-naphthyl | —CH=C(CH$_3$)— | Eth | Sulfate. |
| 2-thienyl | —CH=C(CH$_3$)— | Eth | Benzoate. |
| 2-chlorophenyl | —CH=C(CH$_3$)— | Eth | Pamoate. |
| 4-bromophenyl | —CH=C(CH$_3$)— | Eth | Do. |
| 2-nitrophenyl | —CH=C(CH$_3$)— | Eth | Do. |
| 2-methylphenyl | —CH=C(CH$_3$)— | Eth | Nitrate. |
| Phenyl | —CH=C(CH$_3$)— | Eth | |
| 1-naphthyl | —C(CH$_3$)=CH— | Eth | Citrate. |
| 2-thienyl | —C(CH$_3$)=CH— | Eth | Tartrate. |
| Phenyl | —C(CH$_3$)=CH— | Eth | |
| 2-chlorophenyl | —C(CH$_3$)=CH— | Eth | Sulfate. |
| 4-bromophenyl | —C(CH$_3$)=CH— | Eth | Hydrobromide. |
| 3-fluorophenyl | —C(CH$_3$)=CH— | Eth | |
| 2-nitrophenyl | —C(CH$_3$)=CH— | Eth | |
| 2-methylphenyl | —C(CH$_3$)=CH— | Eth | |
| 4-ethylphenyl | —C(CH$_3$)=CH— | Eth | Hydrochloride. |
| 3,4-methylenedioxyphenyl | —C(CH$_3$)=CH— | Eth | Sulfate. |

Two control paddies are also run. One control receives no treatment of any kind; the other is treated with phenylmercuryacetate dust at the same level of concentration.

Effective control of rice blast disease is realized in both treated paddies whereas the untreated paddy is severely attacked by the disease.

EXAMPLE IV

An emulsifiable concentrate containing 10 percent (by weight) of 2-[2-(2-chlorophenyl)ethyl]-5,6-dihydro-4H-1,3-thiazine (free base) in toluene, and polyoxyethylenelauryl ether as emulsifying agent (4 percent by weight) is mixed with sufficient water to provide emulsions containing 500, 250 and 100 p.p.m. of active ingredient.

Spray application of these emulsions to rice plots at the rate of 160 liters per acre effectively prevent rice blast.

Similar results are obtained with the following compounds at the same rate of application.

R—Y—⟨N,S⟩Z·HA

| R | Y | Z | Salt (HA) |
| --- | --- | --- | --- |
| 2-thienyl | —CH$_2$CH$_2$— | Tri | |
| Phenyl | —CH$_2$CH$_2$— | Tri | |
| 2-chlorophenyl | —CH$_2$CH$_2$— | Tri | Benzoate. |
| Do | —CH$_2$CH$_2$— | Tri | p-Toluenesulfonate. |
| Do | —CH$_2$CH$_2$— | Tri | |
| 2-bromophenyl | —CH$_2$CH$_2$— | Tri | |
| 2-methylphenyl | —CH$_2$CH$_2$— | Tri | Benzoate. |
| 2-fluorophenyl | —CH$_2$CH$_2$— | Tri | Acetate. |
| 2-chlorophenyl | —(CH$_2$)$_3$— | Tri | |
| Do | —(CH$_2$)$_4$— | Tri | Acetate. |
| 3-methylphenyl | —(CH$_2$)$_3$— | Tri | Do. |
| 2-thienyl | —CH$_2$CH$_2$— | Eth | |
| 2-phenyl | —CH$_2$CH$_2$— | Eth | |
| 2-chlorophenyl | —CH=CH— | Tri | |
| Do | —CH=CH— | Tri | Benzoate. |
| Do | —CH=CH— | Tri | Acetate. |
| 4-chlorophenyl | —CH=CH— | Tri | Butyrate. |
| Do | —CH=CH— | Tri | Laurate. |
| 2-bromophenyl | —CH=CH— | Tri | |
| 2-methylphenyl | —CH=CH— | Tri | Benzoate. |
| 3-ethylphenyl | —CH=CH— | Tri | p-Toluenesulfonate. |
| 4-methylphenyl | —CH=CH— | Tri | Benzoate. |
| Phenyl | —CH$_2$CH$_2$— | (*) | |
| Do | —C(CH$_3$)=CH— | Tri | |
| 2-thienyl | —C(OH)=CH— | Tri | |
| Do | —C(CH$_3$)=CH— | Tri | |
| 2-chlorophenyl | —C(CH$_3$)=CH— | Eth | |
| 2-methylphenyl | —C(CH$_3$)=CH— | Tri | Stearate. |
| 2-chlorophenyl | —C(OH)=CH— | Eth | |
| 2-naphthyl | —CH=CH— | Tri | |

*—C(CH$_3$)—CH$_2$CH$_2$—.

PREPARATION A 5,6-Dihydro-2-[2-hydroxy-2-(2-thienyl)vinyl]-4H-1,3-thiazine

Under a nitrogen atmosphere, a mixture of 15.1 g. (0.10 moles) of β-oxo-2thiophenepropiontrile, 14.0 g. (0.11 moles) of 3-amino-1-propanethiol hydrochloride, 11.1 g. (0.11 moles) of triethylamine, and 100 ml. of ethanol is heated under reflux for 18 hours. The reaction mixture is cooled then poured into an aqueous 5 percent sodium carbonate solution. The basic mixture is extracted with chloroform, the exact dried filtered and evaporated to furnish the crude dihydrothiazine: m.p. 99–100° C.; yield 10.1 g. (45 percent). Two recrystallizations from 2-propanol afford analytically pure material: m.p. 100–101° C. $\lambda_{max}$ (MeOH) 259 mμ (ε 12,600), 363 mμ (ε35,400).

Analysis:

Calc'd. for C$_{10}$H$_{11}$NOS$_2$: C, 53.3; H, 4.9; N, 6.2 percent
Found: C, 53.3; H, 4.9; N, 6.2 percent.

The following compounds can be prepared by the above procedure but substituting the appropriate β-oxo-β-(substituted)propionitrile for β-oxo-2thiophenepropionitrile. The thiazoline derivatives listed are prepared as above but using cysteamine hydrochloride in place of 3-amino-1propanethiol hydrochloride.

R—C(OH)=CH—⟨N,S⟩Z

| R | Z[a] | R | Z[a] |
| --- | --- | --- | --- |
| 1-naphthyl[b] | tri | 2-napthyl | tri |
| phenyl | tri | 2-chlorophenyl | tri |
| 4-bromophenyl | tri | 3-fluorophenyl | tri |
| 4-nitrophenyl | tri | 2-methylpenyl | tri |
| 4-ethylphenyl[b] | tri | 3,4-methylenedioxyphenyl[b] | tri |
| 1-naphthyl | eth | 2-thienyl | eth |
| phenyl | eth | 2-chlorophenyl | eth |
| 3-chlorophenyl | eth | 2-bromophenyl | eth |
| 4-fluorophenyl | eth | 2-nitrophenyl | eth |
| 2-methylphenyl | eth | 4-ethylphenyl | eth |
| 3,4-methylenedioxyphenyl | eth | | |

[a] tri = trimethylene; eth = ethylene.

[b] The necessary β-oxopropiophenones R—CO—CH$_2$—CN wherein R is 1-naphthyl-, 4-ethylephenyl- and 3,4-methylenedioxyphenyl can be prepared by hydrolysis and decarboxylation of the corresponding cyanoacetates R—CO—CH(COOC$_2$H$_5$)CN at 40–60° C. with 3–10 percent sodium hydroxide. The cyanoacetates are prepared by condensation of the acylchlorides R—COCL with ethyl cyanoacetate in the presence of sodium in benzene solution (C.A. 55, 18747f).

PREPARATION B 5,6-Dihydro-2-(α-methylstyryl)-4H-1,3-thiazine Hexafluorophosphate A solution of 12.9 grams (0.10 moles) of 2-ethyl-5,6-dihydro-4H-1,3-thiazine, 11.7 grams (0.11 moles) of benzaldehyde, 2 ml. of piperidine and 40 ml. of toluene is heated under reflux in an apparatus which includes a Dean-Stark moisture trap. After 8 hours, when no more water is collected in the trap, the more volatile components are removed by evaporation under reduced pressure. The dark residue is dissolved in ether, treated with activated carbon, and filtered. The ether solution is extracted with 100 ml. of 1N hydrochloric acid, and the acidic aqueous extract then treated with 25 grams of 65 percent aqueous hexafluorophosphoric acid to give a colorless precipitate of the crude product. After two recrystallizations from ethanol, 6.0 grams (17 percent of analytically pure material is obtained: m.p. 132–134° C.
Analysis:
calc'd for $C_{13}H_{16}F_6NPS$: C, 43.0; H, 4.4; N, 3.9 percent
Found: C, 43.2; H, 4.4; N, 3.8 percent.

PREPARATION C 5,6-Dihydro-2-[1-methyl-2-(2-thienyl)vinyl]-4H-1,3-thiazine hydrochloride This is prepared from 12.9 grams (0.10 moles) of 2-ethyl-5,6-dihydro-4H-1,3-thiazine, 12.3 grams (0.11 moles) of 2thiophenecarboxaldehyde, 2 ml. of piperidine and 40 ml. of toluene in the manner described above. After the ether solution is treated with activated carbon and is filtered, the filtrate is treated with dry hydrogen chloride to finish a yellow gummy precipitate. The precipitate is recrystallized twice from 2-propanol to give analytically pure material: m.p. 192–194° C., yield 9.1 grams (35 percent).
Analysis:
Calc'd. for $C_{11}H_{14}ClNS_2$: C, 50.9; H, 5.4; N, 5.4 percent
Found: C, 51.1; H, 5.5; N, 5.1 percent By means of this procedure, the following compounds are prepared from the appropriate aldehyde, R—CHO, and 2-ethyl-5,6-dihydro-4 H-1,3-thiazine or 2-ethyl-2-thiaxoline.

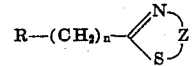

| R | Z | Salt (HA) |
|---|---|---|
| 2-naphthyl | eth | HCl |
| 2-thienyl | eth | HCl |
| phenyl | eth | HPF$_6$ |
| 2-chlorophenyl | eth | HCl |
| 4-bromophenyl | eth | HCl |
| 2-nitrophenyl | eth | HCl |
| 2-methylphenyl | eth | HPF$_6$ |
| 1-naphthyl | tri | HPF$_6$ |
| 2-naphthyl | tri | HPF$_6$ |
| 2-chlorophenyl | tri | HCl |
| 3-chlorophenyl | tri | HCl |
| 2-bromophenyl | tri | HCl |
| 4-bromophenyl | tri | HCl |
| 2-fluorophenyl | tri | HPF$_6$ |
| 2-nitrophenyl | tri | HCl |
| 3-nitrophenyl | tri | HCl |
| 2-methylphenyl | tri | HCl |
| 4-methylphenyl | tri | HCl |
| 3-ethylphenyl | tri | HPF$_6$ |
| 3,4-methylenedioxyphenyl | tri | HCl |

PREPARATION D 5,6-Dihydro-2-[3-(2-chlorophenyl)propyl]-4H-1,3-Thiazine

A mixture of 4-(2-chlorophenyl)butyronitrile (0.1 mole), 3-amino-1-propanethiol hydrochloride (0.1 mole), triethylamine (0.107 mole) and absolute ethanol (10 ml.) is heated under reflux for 1 hour or until ammonia is no longer evolved. The mixture is cooled to room temperature then poured into 250 ml. of cold water. The aqueous mixture is made basic with potassium hydroxide and the oil which separates extracted several times with ether. The combined ethereal extracts are dried ($Na_2SO_4$), filtered and evaporated to give the crude product which can be purified by fractional distillation.

By means of this procedure, the following compounds are prepared from appropriate reactants:

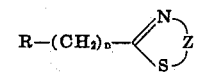

| R | n | Z | R | n | Z |
|---|---|---|---|---|---|
| 2-chlorophenyl | 3 | Eth. | 4-bromophenyl | 4 | Eth. |
| 4-chlorophenyl | 3 | Tri. | 2-nitrophenyl | 3 | Tri. |
| Do | 3 | Eth. | 3-nitrophenyl | 4 | Eth. |
| 2-chlorophenyl | 4 | Tri. | 2-nitrophenyl | 4 | Tri. |
| Do | 4 | Eth. | 4-nitrophenyl | 4 | Eth. |
| 4-chlorophenyl | 4 | Tri. | 3-nitrophenyl | 4 | Tri. |
| 3-chlorophenyl | 4 | Eth. | Phenyl | 3 | Tri. |
| 2-bromophenyl | 4 | Tri. | Do | 4 | Tri. |
| Do | 4 | Eth. | Do | 4 | Eth. |
| 4-bromophenyl | 3 | Tri. | 4-nitrophenyl | 3 | Eth. |

PREPARATION E 5,6-Dihydro-2-[4-(2-Methylphenyl)Butyl]-4H-1,3-Thiazine

A mixture of methyl 4-(2-methylphenyl)butyrate (0.37 mole) and 3-amino-1-propanol (0.40 mole) is heated slowly to 220° C. to form crude N-(3-hydroxypropyl)-[4-(2-methylphenyl)butyramide] and to drive off by-product methanol. The crude amide is placed in a Claisen distillation apparatus and treated with 19.5 g. of phosphorous pentasulfide. The mixture is warmed to start the reaction and, when most of the foaming subsides, residual gases are removed in vacuo. The product is then recovered by distillation in vacuo.

The following compounds are similarly prepared from appropriate reactants $R—(CH_2)n—COOCH_3$, 3-amino-1-propanol and ethanol-amine:

$$R—(CH_2)_n—\underset{S}{\overset{N}{\diagdown}}Z$$

| R | n | Z | R | n | Z |
|---|---|---|---|---|---|
| 4-chlorophenyl | 3 | Tri. | 4-ethylphenyl | 3 | Tri. |
| Do | 4 | Tri. | Do | 4 | Tri. |
| Do | 3 | Eth. | 3-ethylphenyl | 4 | Eth. |
| Do | 4 | Eth. | 3-methylphenyl | 3 | Tri. |
| 2-chlorophenyl | 4 | Tri. | 4-ethylphenyl | 3 | Tri. |
| Do | 4 | Eth. | 1-napthyl | 3 | Tri. |
| 3-chlorophenyl | 4 | Eth. | Do | 3 | Eth. |
| 2-fluorophenyl | 4 | Eth. | Do | 4 | Tri. |
| 3-fluorophenyl | 3 | Tri. | 2-naphthyl | 4 | Tri. |
| 4-fluorophenyl | 3 | Eth | Do | 4 | Eth. |
| 2-methylphenyl | 3 | Tri, | 3,4-methylenedioxyphenyl, | 4 | Tri. |
| 4-methylphenyl | 3 | Tri. | 3-methylphenyl | 4 | Tri. |
| 2-methylphenyl | 4 | Eth, | 4-methylphenyl | 4 | Eth. |

PREPARATION F 5,6-Dihydro-2-[2-Methyl-2-(4-Chlorostyryl)]-4H-1,3-Thiazine a. Ethyl β-methyl-2-chlorocinnamate Following the procedure of Wadsworth and Emmons (J. Am. Chem. Soc. 83, 1733, 1961), a mixture of 48 g. (1.0 mole) of 50 percent sodium hydride in mineral oil and 1,000 ml. of 1,2-dimethoxyethane is stirred under a nitrogen atmosphere, and is treated dropwise with 224 g. (1.0 mole) of triethyl phosphonoacetate. During the addition the internal temperature of the mixture rises to 35° C. Stirring is continued for an hour, and 143 grams (1.0 mole) of 4-chloroacetophenone then added dropwise at such a rate that the temperature is maintained at approximately 30° C. Stirring is continued for 2 days. The reaction mixture is then poured into 3 liters of water, and extracted with ether. The extract is dried over anhydrous sodium sulfate, filtered, evaporated and the residue distilled in vacuo.

b. β-Methyl-4-chlorocinnamic acid

A mixture of 22.5 g. (0/07 mole) of ethyl β-methyl-4-chlorocinnamate acrylate, 4.0 g. (0.1 mole) of sodium hydroxide, and 40 ml. of methanol is heated under reflux for 3 hours, then allowed to cool to room temperature, and evaporated under reduced pressure. The residue is taken up in water, washed with diethyl ether, and treated with concentrated hydrochloric acid. Crude β-methyl-4-chlorocinnamic acid precipitates from the aqueous solution.

c. β-Methyl-4-chlorocinnamide

Following the procedure of Cramer and Winter (Ber. 94, 989, 1961 ), and using carefully dried equipment, a solution of 19.3 g. (0.1 mole) of β-methyl-4-chlorocinnamic acid, 10.1 g. (0.1 mole) of triethylamine, 7.3 g. of dimethylformamide and 15 ml. of acetonitrile is stirred for an hour and, with ice cooling, treated dropwise with 17.3 g. (0.01 mole) of diethylphosphoryl chloride. The reaction mixture is allowed to warm to room temperature and is then treated with 150 ml. of benzene. Insoluble matter is filtered and washed with 50 ml. of fresh benzene. The stirred filtrate is cooled to 0° C., and treated with a large excess of anhydrous ammonia. Cooling and stirring are continued for 2 hours. The mixture is evaporated under reduced pressure, and the residue triturated under cold water to furnish crude β-methyl-4-chlorocinnamide.

d. 5,6-Dihydro-2-[2-methyl-2-(4-chlorostyryl)]-4H-1,3-thiazine hexafluorophosphate With magnetic stirring a slurry of 9.8 g. (0.05 mole) of β-methyl-4-chlorocinnamide in 100 ml. of anhydrous diethylether is cooled in an ice bath, and treated portionwise with 9,5 g. (0.05 mole) of triethyloxonium fluoborate (H. Meerwein, J. prakt. Chem. 154, 83, 1940 ). The mixture is allowed to warm to room temperature, and stirring is continued overnight. During this time the initially colorless solids turn yellow. Upon filtration, crude ethyl β-methyl-4-chlorocinnimidate fluoborate is recovered.

Without further purification, the imidate salt is added portionwise to a stirred, ice-cooled solution of 4.6 g. (0.05 mole) of 3-amino-1-propanethiol in 100 ml. of methanol. The resulting solution is heated under reflux for 2 days, allowed to cool to room temperature and the volatile components evaporated under reduced pressure. The residue is slurried in water, and treated with 5 ml. of 65 percent hexafluorophosphoric acid. The crystalline solids are filtered and recrystallized from 2-propanol/water to give the title product.

The following compounds are similarly prepared from the appropriate ketones R-CO-CH₃ and thiol-amines H₂N-Z-SH:

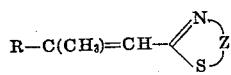

| R | Z |
|---|---|
| 1-naphthyl | tri |
| 2-naphthyl | tri |
| 4-chlorophenyl | tri |
| 4-bromophenyl | tri |
| 4-bromophenyl | eth |
| 3-methylphenyl | tri |
| 4-ethylphenyl | tri |
| 2-nitrophenyl | tri |
| 2-nitrophenyl | eth |
| 4-ethylphenyl | eth |
| 3,4-methylenedioxyphenyl | tri |
| 3,4-methylenedioxyphenyl | eth |

PREPARATION G

Salt Formation

The salts of the products of the preceding preparations are neutralized to their free bases and the resulting bases converted to acid addition salts by treatment with an equimolar proportion of the appropriate acid in methanol as solvent. The salts are recovered by precipitation with a nonsolvent, e.g., ether, hexane or, alternatively, if desired, by evaporation of the solvent. The following salts are thus prepared: p-toluenesulfonate, pamoate, amsonate, 2-hydroxy-3-naphthoate, stearate, citrate, gluconate, benzoate, acetate, propionate, butyrate, sulfate, nitrate, phosphate, hydrobromide, ββ-dimethylbutyrate, maleate, oxalate, succinate, malate, tartrate and fumarate.

What is claimed is:

1. A process for the prevention of rice blast disease on rice plants which comprises contacting the plants with a fungicidally effective amount, in admixture with a carrier therefor, of a compound having the formula

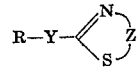

and the nonphytotoxic acid addition salts thereof wherein R is selected from the group consisting of 1-naphthyl, 2-naphthyl, 2-thienyl, 3,4-methylenedioxyphenyl and

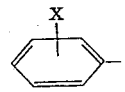

wherein

X is selected from the group consisting of hydrogen, chloro, bromo, fluoro, nitro, methyl and ethyl; with the proviso that when Y is —(CH₂)ₙ—, X is other than hydrogen;

Z is trimethylene; and

Y is selected from the group consisting of —CH=CH—, —C(CH₃)=CH—, —CH=C(CH₃)—, —C(OH)=CH—, and —CH₂)n—wherein n is an integer of from 2 to 4.

2. The process of claim 1 wherein the compound is of the formula

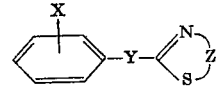

and the nontoxic acid addition salts thereof wherein Y is —CH=CH—and Z is trimethylene.

3. The process of claim 1 wherein the compound is of the formula

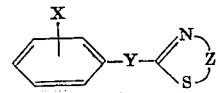

and the nontoxic acid addition salts thereof wherein Y is —(CH₂)₂—and Z is trimethylene.

4. The process of claim 2 wherein X is chloro, said compound having the formula

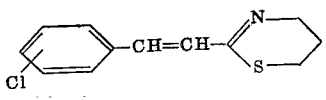

5. The process of claim 2 wherein X is methyl, said compound having the formula

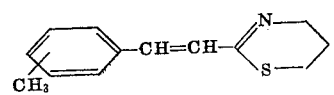

6. The process of claim 2 wherein X is hydrogen, said compound having the formula

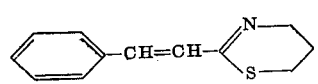

7. The process of claim 3 wherein X is chloro, said compound having the formula
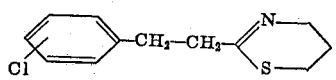
8. The process of claim 4 wherein X is 2-chloro.
9. The process of claim 5 wherein X is 4-methyl.
10. The process of claim 7 wherein X is 2-chloro.